(12) United States Patent
Ozaki et al.

(10) Patent No.: US 7,912,286 B2
(45) Date of Patent: Mar. 22, 2011

(54) IMAGE PROCESSING APPARATUS AND METHOD OF IMAGE PROCESSING CAPABLE OF EFFECTIVE LABELING

(75) Inventors: Tomoaki Ozaki, Hyogo (JP); Shinichi Yamaura, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 951 days.

(21) Appl. No.: 11/430,861

(22) Filed: May 10, 2006

(65) Prior Publication Data

US 2006/0274940 A1    Dec. 7, 2006

(30) Foreign Application Priority Data

May 10, 2005    (JP) .................. 2005-137465

(51) Int. Cl.
*G06K 9/34* (2006.01)
(52) U.S. Cl. .................. 382/180; 382/173; 382/177
(58) Field of Classification Search .................. None
See application file for complete search history.

(56) References Cited

U.S. PATENT DOCUMENTS

| | | | | |
|---|---|---|---|---|
| 4,624,013 A | * | 11/1986 | Urushibata | 382/180 |
| 4,791,676 A | * | 12/1988 | Flickner et al. | 382/204 |
| 4,887,302 A | * | 12/1989 | Urushibata | 382/180 |
| 5,018,214 A | * | 5/1991 | Pasch | 382/180 |
| 5,199,083 A | * | 3/1993 | Takeda | 382/180 |
| 5,239,596 A | * | 8/1993 | Mahoney | 382/180 |
| 5,305,393 A | * | 4/1994 | Kawai et al. | 382/180 |
| 5,602,940 A | * | 2/1997 | Inoue et al. | 382/180 |
| 5,937,091 A | * | 8/1999 | Yanagishita et al. | 382/180 |
| 6,038,335 A | * | 3/2000 | Yokoyama et al. | 382/141 |
| 6,082,619 A | * | 7/2000 | Ma et al. | 235/462.1 |
| 6,643,400 B1 | * | 11/2003 | Murakawa et al. | 382/195 |
| 6,853,738 B1 | * | 2/2005 | Nishigaki et al. | 382/106 |
| 7,254,268 B2 | * | 8/2007 | Zhao et al. | 382/190 |
| 2002/0063893 A1 | * | 5/2002 | Fujieda | 358/1.15 |
| 2003/0076991 A1 | * | 4/2003 | Nishide | 382/154 |
| 2003/0081836 A1 | * | 5/2003 | Averbuch et al. | 382/199 |

(Continued)

FOREIGN PATENT DOCUMENTS

JP    62-009478    1/1987

(Continued)

OTHER PUBLICATIONS

Shyue-Wen Yang et al, "VLSI Architecture Design for a Fast Parallel Label Assignment in Binary Image", 2005, ISCAS, vol. 3 pp. 2393-2396.*

(Continued)

*Primary Examiner* — Wes Tucker
*Assistant Examiner* — Avinash Yentrapati
(74) *Attorney, Agent, or Firm* — Dickstein Shapiro LLP

(57) ABSTRACT

A method of labeling of image data includes reading the image data sequentially with units of two successive pixels and providing one label to a target unit of two successive pixels in the image data when a preliminary label is to be assigned to at least one of the two successive pixels of the target unit. And an image processing apparatus includes a memory configured to store image data, a processor configured to process the image data with units of two successive pixels and to provide one label to a target unit of two successive pixels when a preliminary label is to be assigned to at least one of the two successive pixels of the target unit and a memory controller arranged between the memory and the processor and configured to control reading and writing the image data.

19 Claims, 22 Drawing Sheets

U.S. PATENT DOCUMENTS

| | | | |
|---|---|---|---|
| 2003/0161518 A1* | 8/2003 | Vuylsteke | 382/128 |
| 2005/0058345 A1* | 3/2005 | Koide et al. | 382/173 |
| 2005/0163381 A1* | 7/2005 | Ozaki et al. | 382/199 |
| 2006/0153475 A1* | 7/2006 | Ruggiero | 382/276 |
| 2007/0248266 A1* | 10/2007 | Matsuno | 382/180 |
| 2007/0253623 A1* | 11/2007 | Ohira et al. | 382/218 |

FOREIGN PATENT DOCUMENTS

| | | |
|---|---|---|
| JP | 05-233807 | 9/1993 |
| JP | 07-093539 | 4/1995 |
| JP | 2004-038669 | 2/2004 |
| JP | 2004038669 A * | 2/2004 |
| JP | 2004-164017 | 6/2004 |
| WO | WO-2006/019165 * | 2/2006 |
| WO | WO 2006019165 * | 2/2006 |

OTHER PUBLICATIONS

Suzuki et al, "Linear-time connected-component labeling based on sequential local operations", Computer vision and Image Understanding 89, 2003, 1-23.*

Japanese Office Action dated Dec. 7, 2010.

* cited by examiner

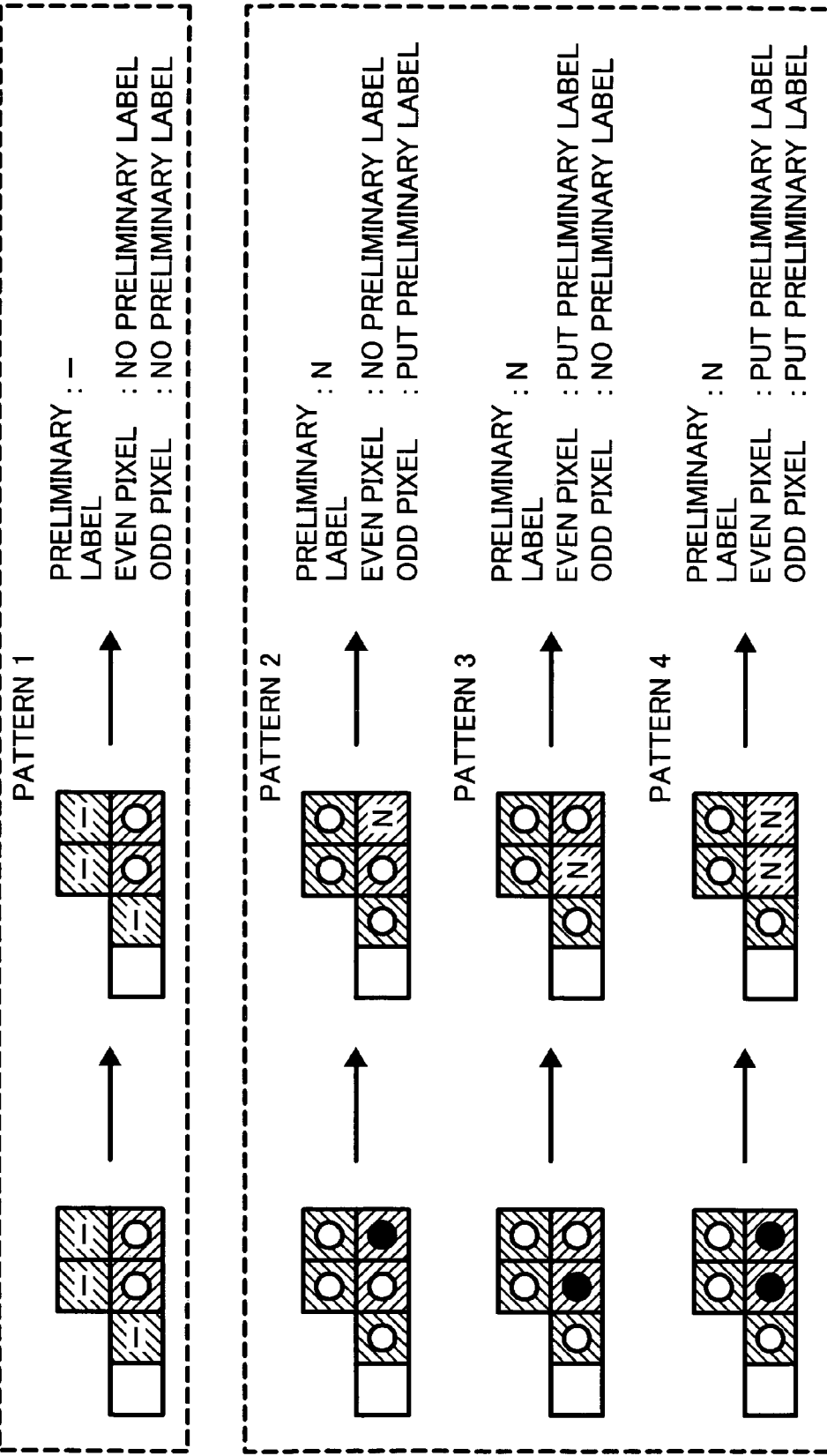

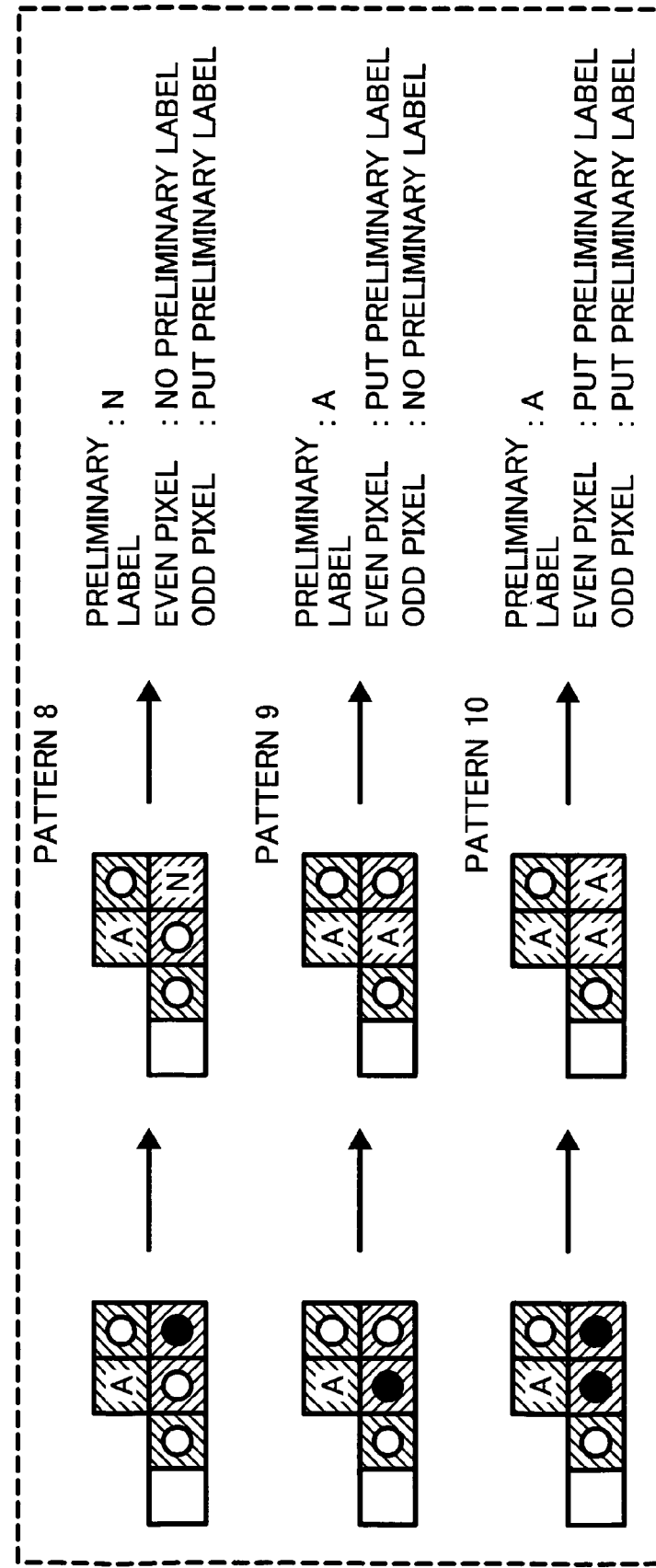

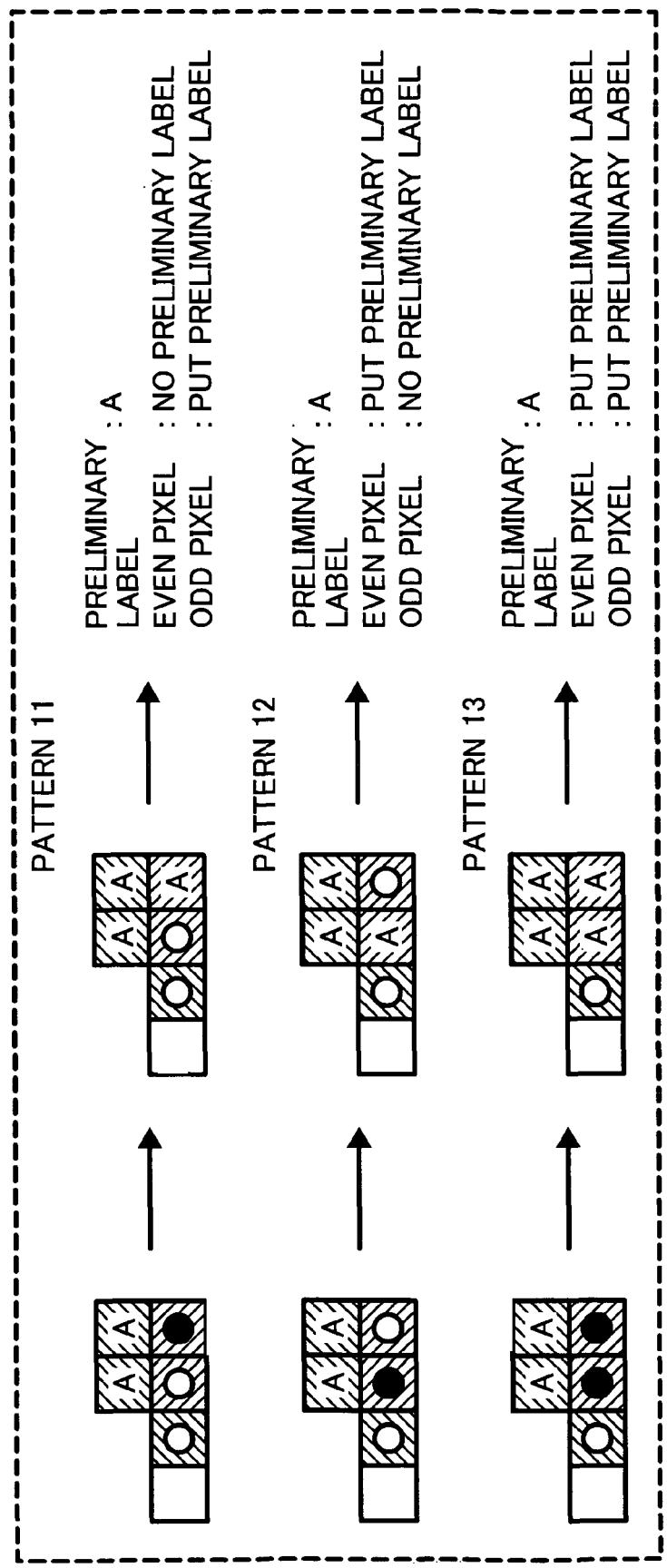

FIG. 7 | FIG. 7A
       | FIG. 7B
FIG. 7A
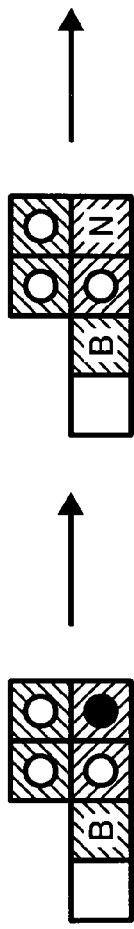
PATTERN 14 → PRELIMINARY LABEL : N
EVEN PIXEL : NO PRELIMINARY LABEL
ODD PIXEL : PUT PRELIMINARY LABEL
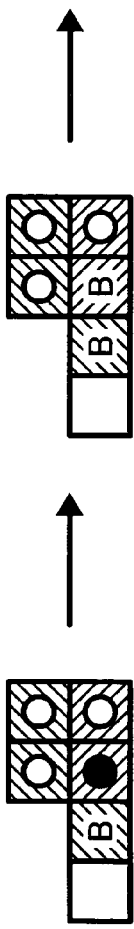
PATTERN 15 → PRELIMINARY LABEL : B
EVEN PIXEL : PUT PRELIMINARY LABEL
ODD PIXEL : NO PRELIMINARY LABEL
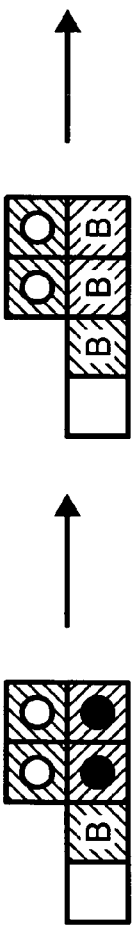
PATTERN 16 → PRELIMINARY LABEL : B
EVEN PIXEL : PUT PRELIMINARY LABEL
ODD PIXEL : PUT PRELIMINARY LABEL

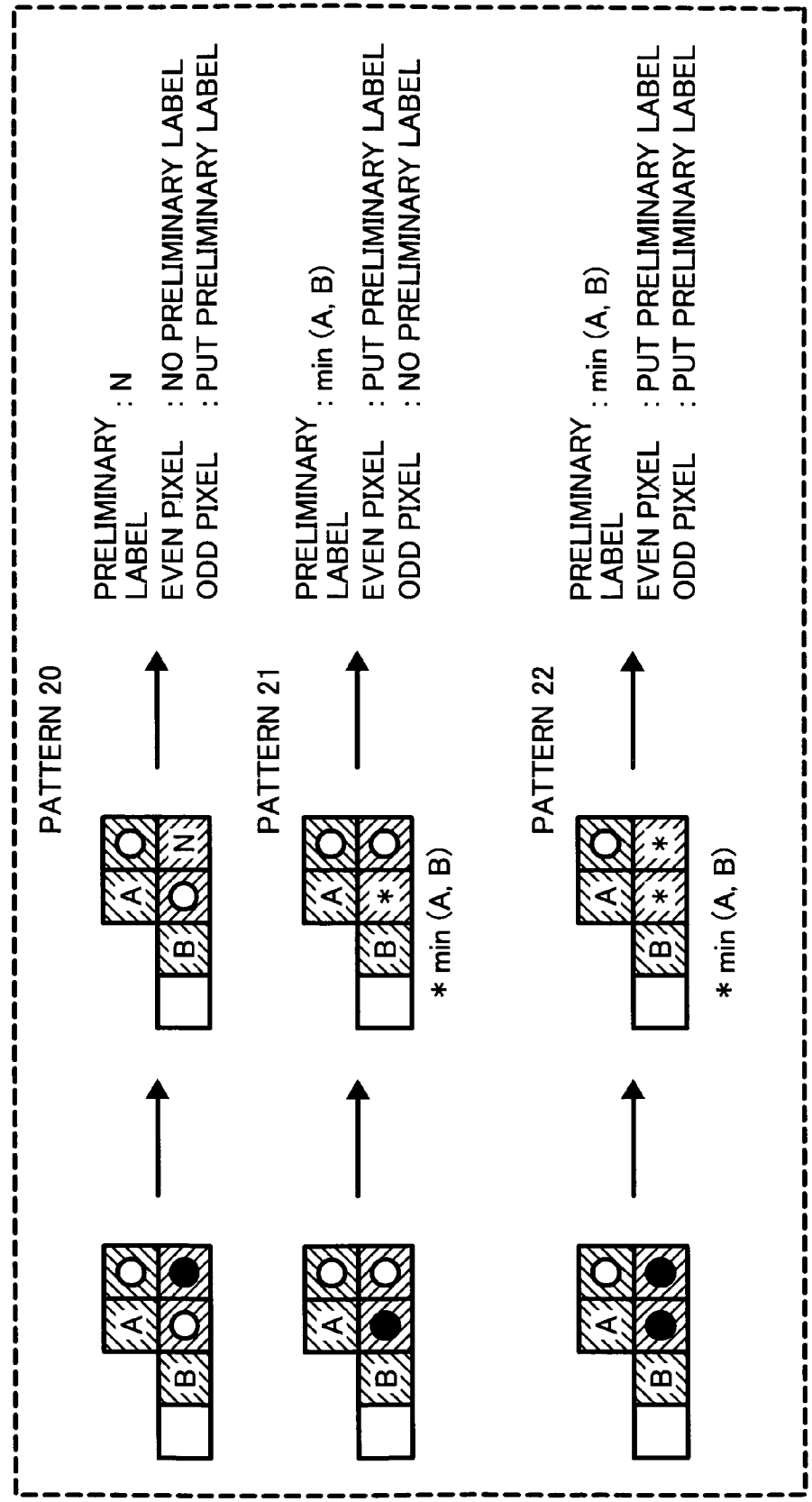

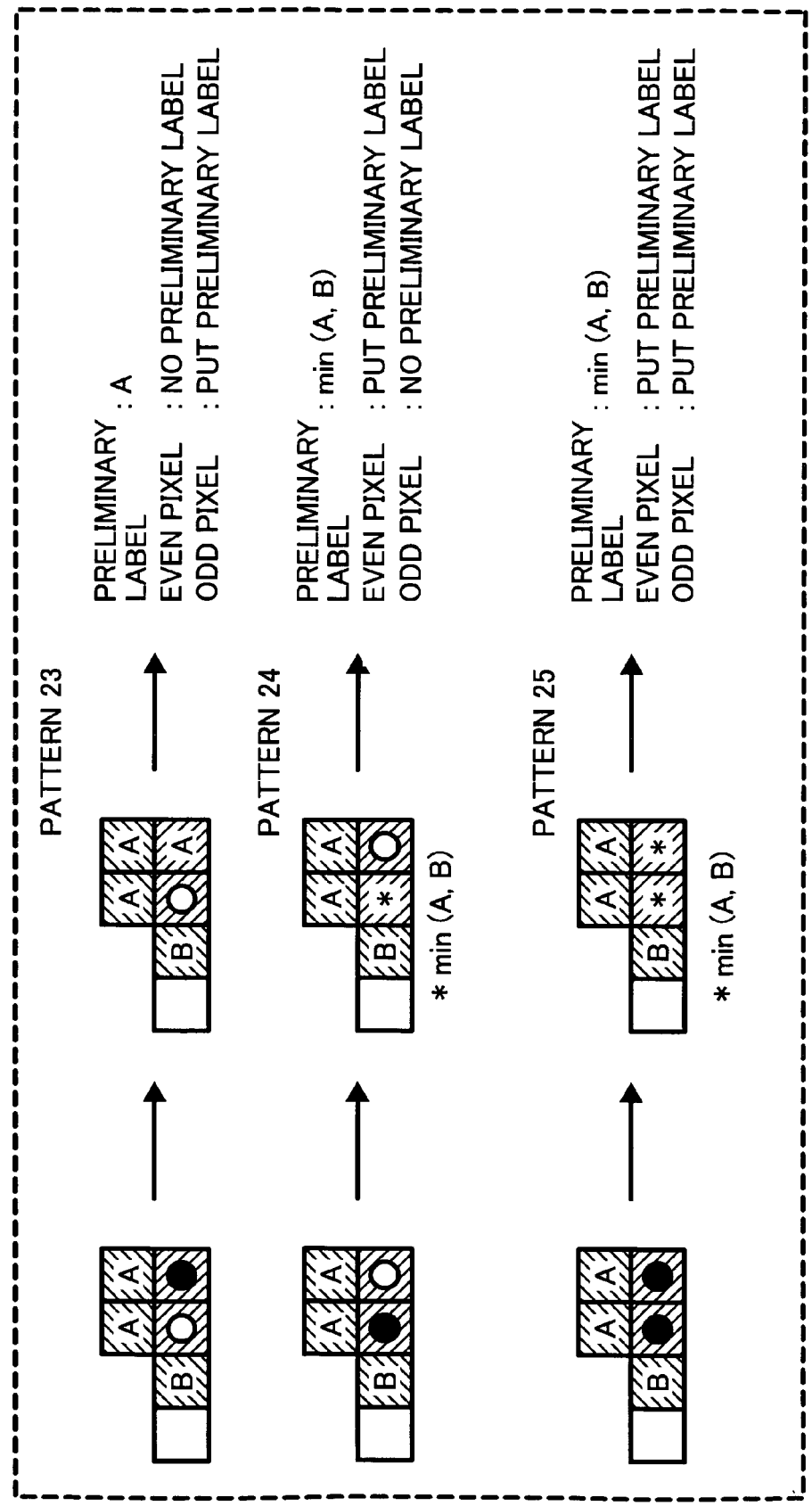

FIG. 13
| FIG. 13A |
|----------|
| FIG. 13B |
| FIG. 13C |
FIG. 13A
PATTERN 101
 →
PRELIMINARY LABEL : —
EVEN PIXEL : NO PRELIMINARY LABEL
ODD PIXEL : NO PRELIMINARY LABEL
PATTERN 102
 →
PRELIMINARY LABEL : N
EVEN PIXEL : NO PRELIMINARY LABEL
ODD PIXEL : PUT PRELIMINARY LABEL
PATTERN 103
 →
PRELIMINARY LABEL : B
EVEN PIXEL : NO PRELIMINARY LABEL
ODD PIXEL : PUT PRELIMINARY LABEL

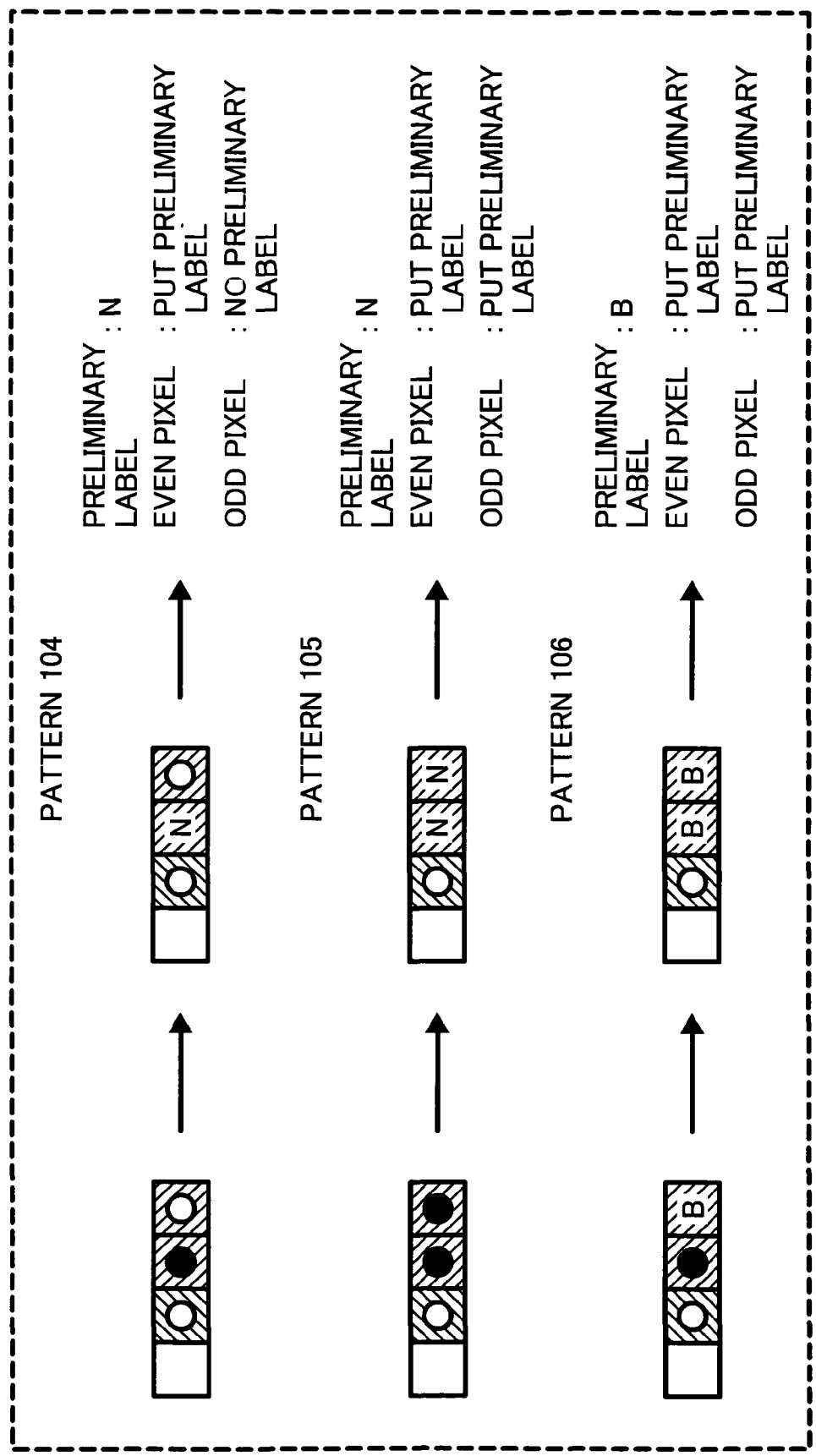

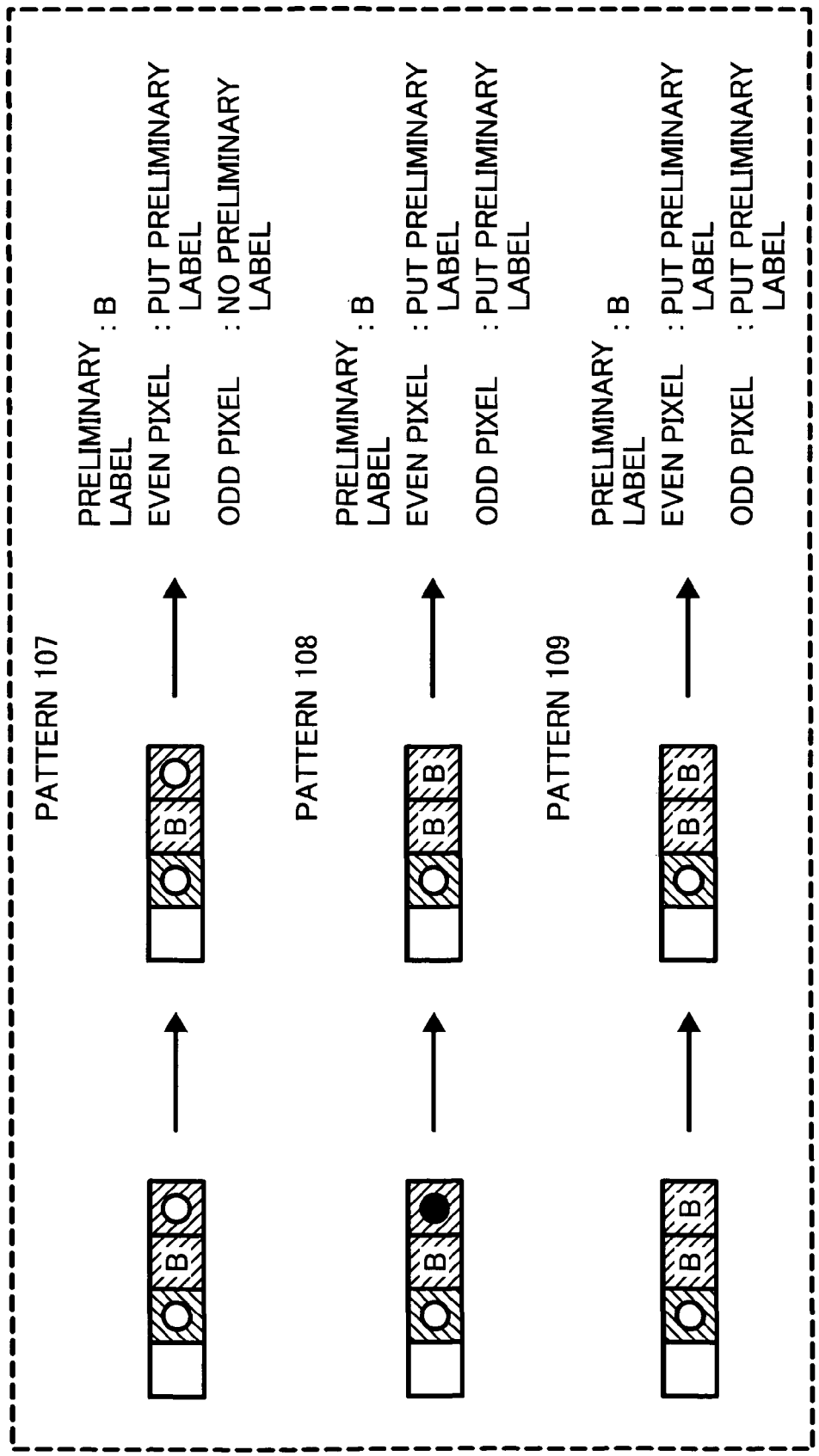

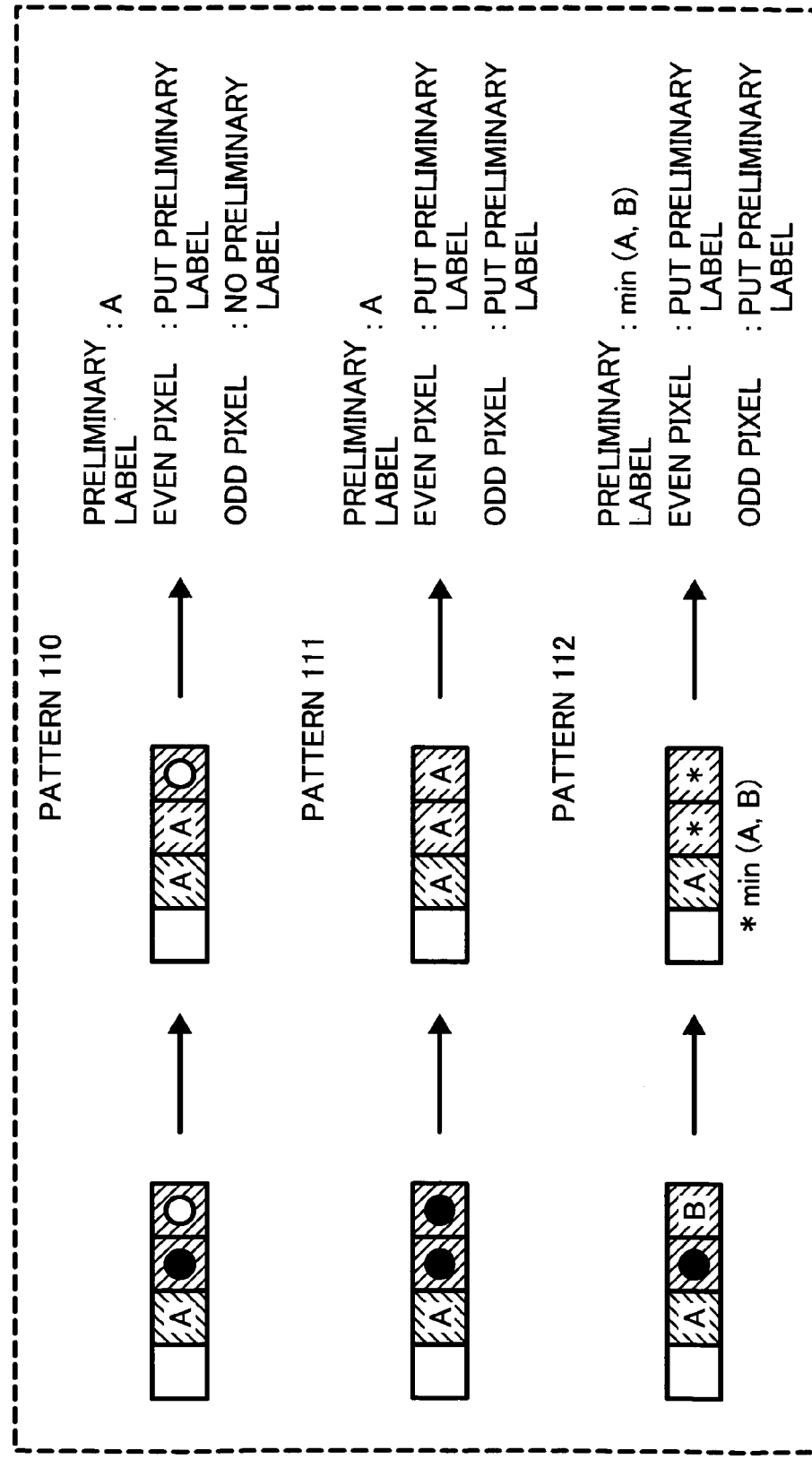

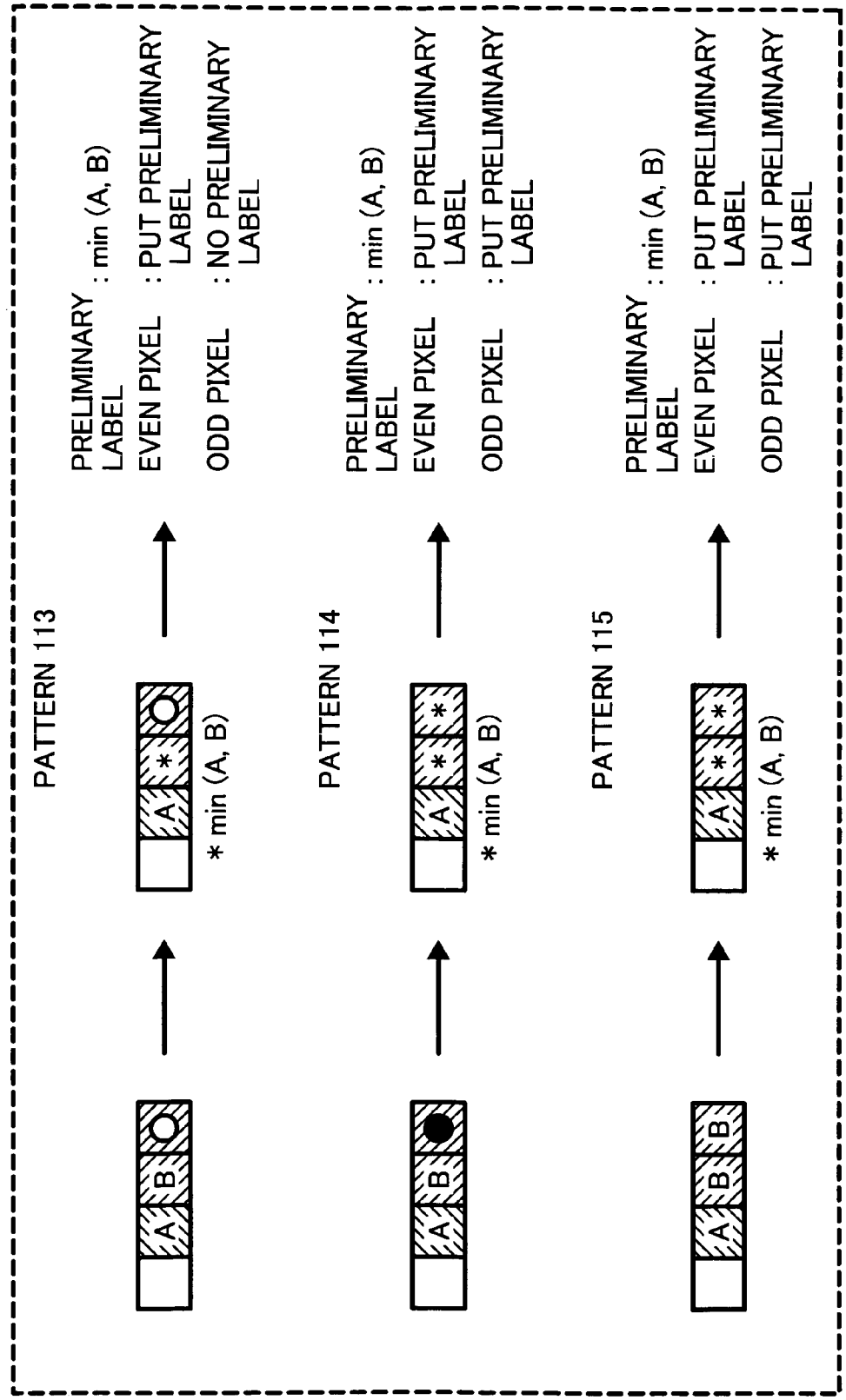

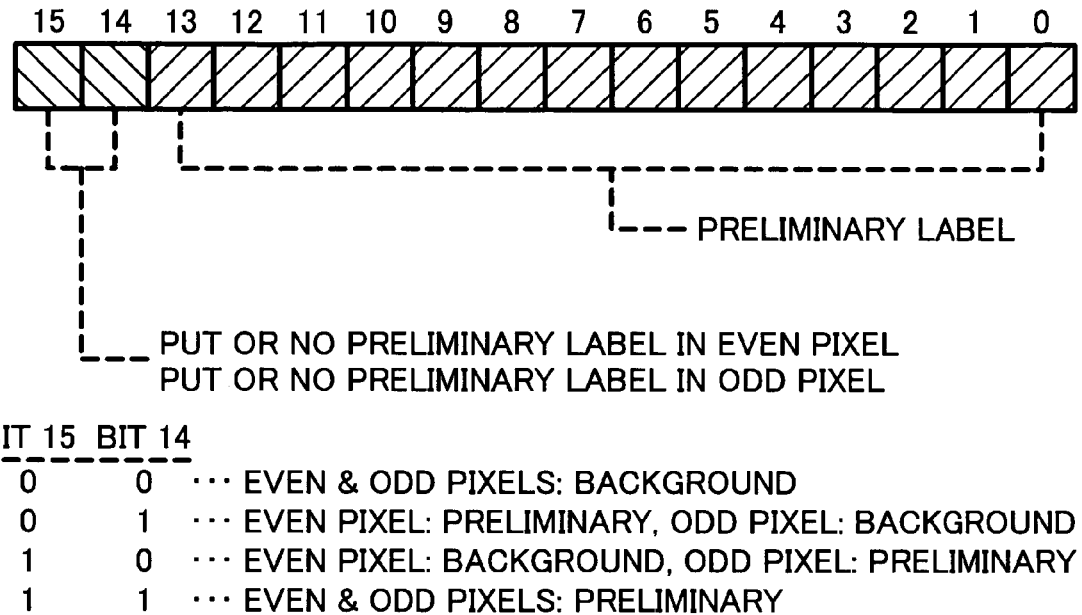
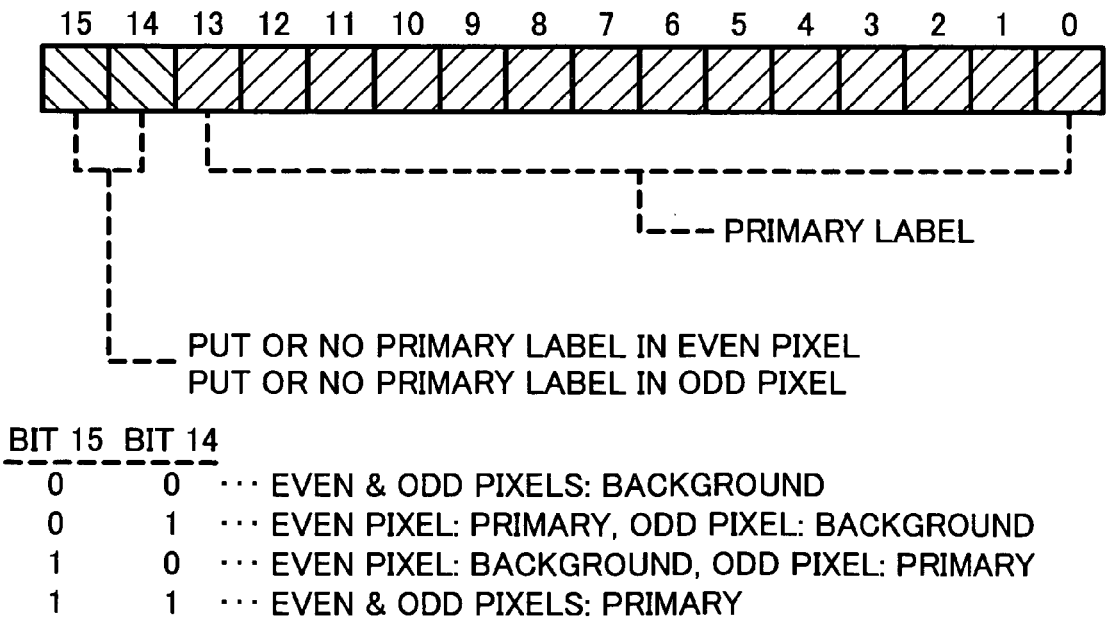

IMAGE PROCESSING APPARATUS AND METHOD OF IMAGE PROCESSING CAPABLE OF EFFECTIVE LABELING

This patent application claims priority to Japanese patent application, No. 2005-137465 filed on May 10, 2005 in the Japan Patent Office, the entire contents of which are incorporated by reference herein.

FIELD

This patent specification describes an image processing apparatus and method of image processing capable of effective labeling.

BACKGROUND

Labeling process is one of key processes of an image processing for binary image data with black and white. Generally, a white pixel is defined as a background pixel and a black pixel is defined as a feature pixel. The labeling process is to assign with a label such as a number to feature pixels linking each other. Using the labeling process, it is possible to identify a plurality of targets in the image and to measure each area size and centroid of the target in the image.

As linking methods which link the pixels, there are mainly two methods that are a 4-linking method (4-neibourhood) and a 8-linking (8-neibourhood) method. In the 4-linking method, the target pixel and four pixels of upper, lower, left and right pixels to the target pixel are judged. In the 8-linking method, four more pixels at diagonal positions of the target pixel are judged in addition to the target pixel, the four pixels as described above.

FIG. 1 illustrates a flowchart of a background labeling method. Following three steps are performed with image data stored in a frame memory.

In step S02, a preliminary labeling (pre-labeling) process is performed. Preliminary labels are assigned and connecting information between the preliminary labels is generated during the pre-labeling process.

In step S04, a translation table for a primary labeling process is generated.

In step S06, the primary labeling process is performed. The preliminary labels are translated to primary labels referring to the translation table generated in the steps S04.

As a result of the above described labeling processes, labeled image data is output and is stored back into the frame memory. The image data stored in the frame memory is scanned sequentially at the both case of the pre-labeling process and the primary labeling process. A plurality of pixels of the image data are read and are translated sequentially.

When the labeling process is performed to binary image data stored in a two-dimensional storage such as a frame memory by the 4-linking method, it is required to scan the binary data sequentially from upper left to lower right of the image data. During the scanning, at least two pixels which are located neighboring at left side and at upper side to the target pixel are referred. This sequential processing causes a long processing time.

Further, it is requested that each pixel has a certain data width such as 8-bits-wide and 16-bits-wide to assign a labeling value. Accordingly, this causes a tradeoff relationship between a number of the labeling to be assigned and a storage capacity of the frame memory.

To shorten the labeling process time, it is proposed to assign a preliminary or a primary label to a plurality of pixels after reading and examining a scanned pixel pattern. This method attempts to obtain a high speed labeling procedure because overlapping at the scanning process is reduced. However, if two pixels are the target pixels, storage capacity for one pixel is increased with increase of the number of labels to be needed because the preliminary or the primary label is assigned to each pixel. Therefore, a breakthrough is highly requested both for achieving high speed labeling and for saving storage capacity of the frame memory.

SUMMARY

This patent specification describes a novel method of image data labeling includes reading the image data sequentially with units of two successive pixels and providing one label to a target unit of two successive pixels in the image data when a preliminary label is to be assigned to at least one of the two successive pixels of the target unit.

This patent specification further describes a novel method of image data labeling includes assigning preliminary labels to pixels, processing image data with units of two successive pixels after the assignment of the preliminary labels and generating processing unit data including first information data of a background pixel or a feature pixel with the preliminary label assigned to an even pixel of the target pixels, second information data of a background pixel or a feature pixel with the preliminary label assigned to an odd pixel of the target pixels and third information data of the preliminary label assigned to at least one of the target pixels.

Further, this patent specification describes a novel image processing apparatus includes a memory configured to store image data, a processor configured to process the image data with units of two successive pixels and to provide one label to a target unit of two successive pixels when a preliminary label is to be assigned to at least one of the two successive pixels of the target unit and a memory controller arranged between the memory and the processor and configured to control reading and writing the image data.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 5A, 5B, 6A, 6B, 7A, 7B 8A and 8B illustrate the details of the preliminary labeling process;

FIGS. 12, 13A, 13B, 13C, 14A and 14B illustrates the details of the preliminary labeling process according to the exemplary embodiment of FIGS. 10 and 11;

FIG. 16 illustrates an example of an output data of a preliminary label according to another exemplary embodiment;

FIG. 17 illustrates an example of an output data of a primary label according to another exemplary embodiment;

DETAILED DESCRIPTION

Figure 1:
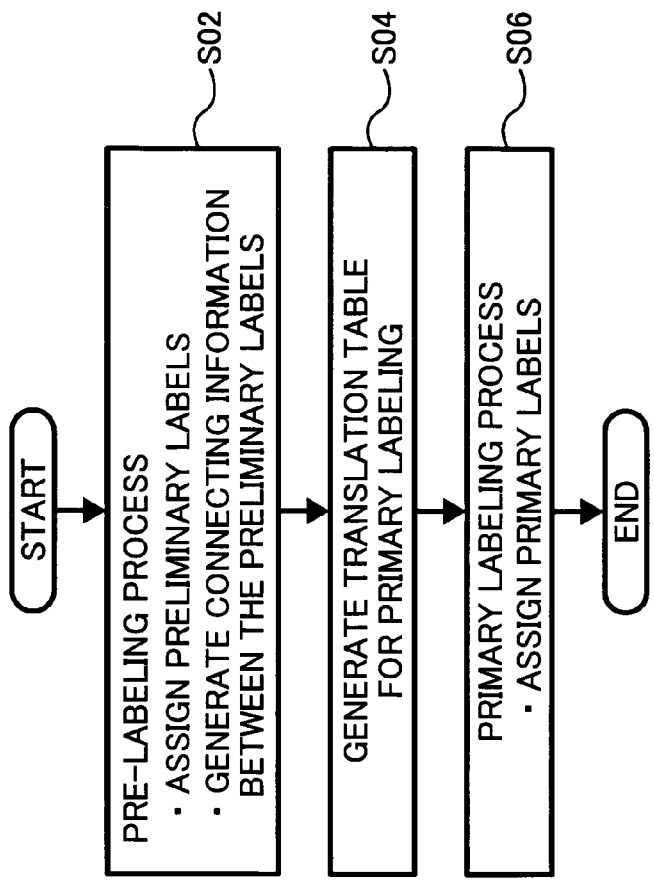
FIG. 1 illustrates a flowchart of a background labeling method.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, labeling processes according to example embodiments are described.

Figure 2:
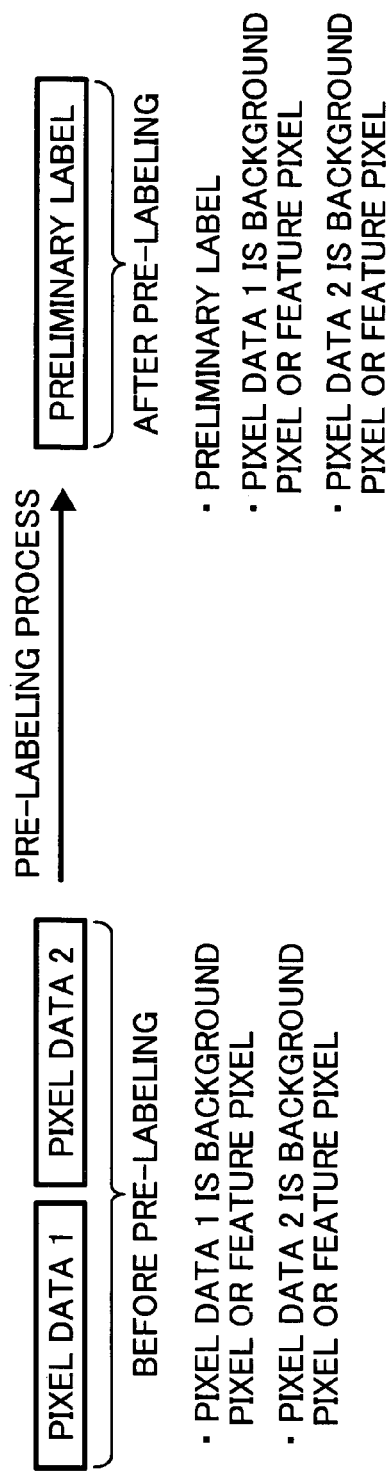
FIG. 2 illustrates a preliminary labeling process according to an exemplary embodiment.

FIG. 2 illustrates a Pre-labeling process according to an exemplary embodiment. The pre-labeling process of the exemplary embodiment includes reading and translating steps. In the reading step, image data is scanned and every two successive target pixels are read sequentially from left to right in a horizontal direction on each line. The two successive pixels includes an even and odd pixels. The even pixel is a pixel at an even number of a target line when the pixels are counted from zero in a scanning direction. Similarly, the odd pixel is a pixel at an odd-number of the target line.

After the reading step, the pixels are translated into one of three types information data such as a preliminary label, a background pixel or a feature pixel (preliminary label) for an even pixel and a background pixel or a feature pixel (preliminary label) for an odd pixel.

Figure 3:
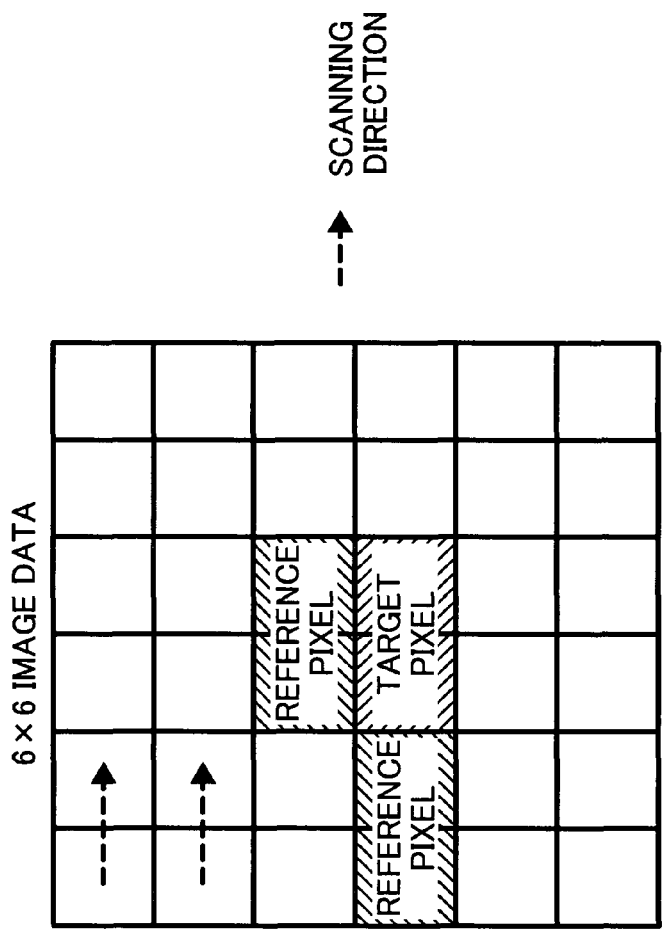
FIG. 3 illustrates the preliminary labeling process with a target image data having a size of 6×6 pixels according to the exemplary embodiment of FIG. 2.

FIG. 3 is a target image data having a size of 6×6 pixels. In the exemplary embodiment, two target pixels and three adjacent pixels to the two target pixels are scanned in a horizontal direction and read. A labeling value for the two target pixels is determined from patterns of the pixels. As for the two reference pixels which locates at next left of the target pixels of FIG. 3, a right-side pixel of the two reference pixels, i.e., neighboring pixel of the target pixels, is only labeled.

Figure 4:
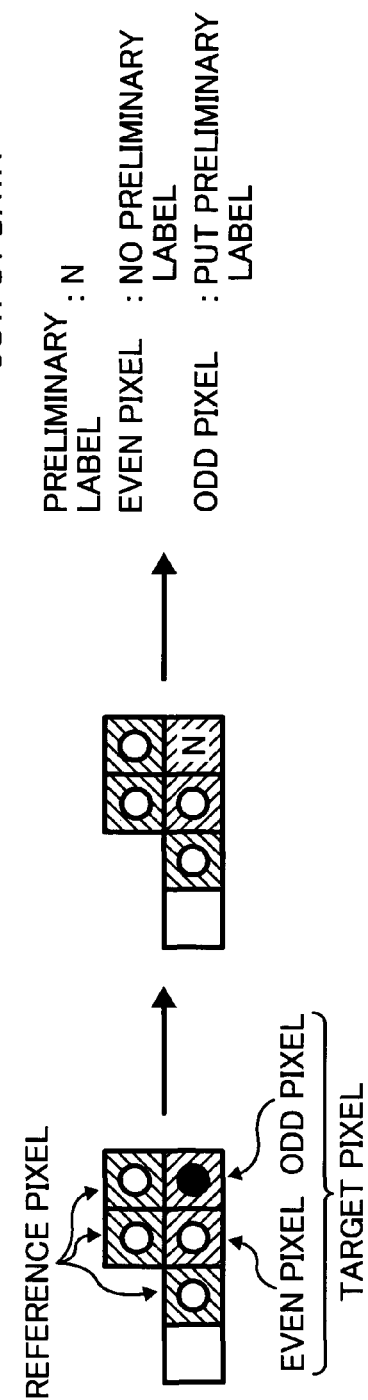
FIG. 4 illustrates an output example data of the preliminary labeling process of the exemplary embodiment of FIG. 3.
Figure 5B:
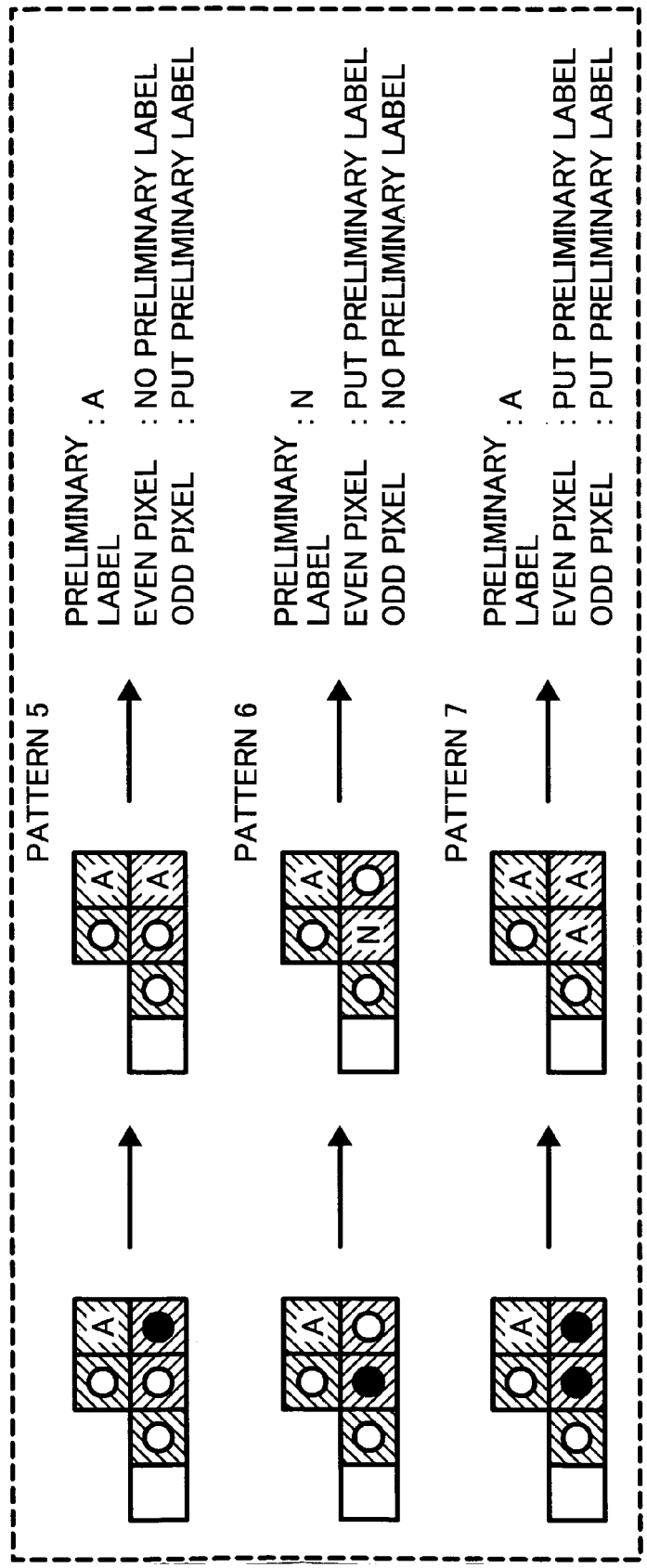

FIG. 4 illustrates an output data example of the pre-labeling process according to the exemplary embodiment. FIGS. 5A, 5B, 6A, 6B, 7A, 7B 8A and 8B illustrate the details of the pre-labeling process. In the example of FIG. 4, the labeling value of the preliminary label is N. The labeling value is assigned for the odd pixel because it is a feature pixel and is not assigned for the even pixel because it is a background pixel.

The symbols used in FIGS. 4 to 8B are summarized in Table 1. Further, the symbols of the Table 1 are also used in other figures.

TABLE 1

| Symbol | Notes |
| --- | --- |
| ○ | background pixel |
| ◉ | feature pixel |
| — | It can be either background pixel or feature pixel |
| N | new preliminary label |
| A | preliminary label of value A |
| B | preliminary label of value B |
| min (A, B) | smaller value among values A and B |
| max (A, B) | larger value among values A and B |

FIGS. 5A, 5B, 6A, 6B, 7A, 7B, 8A and 8B illustrate a determination process of preliminary labels. The preliminary label for the target pixels are determined based on the information of the two target pixels and the three associated pixels which are located next to the two target pixels. The Pre-labeling process in the exemplary embodiment is a four-interlink-pixel processing.

Figure 7B:
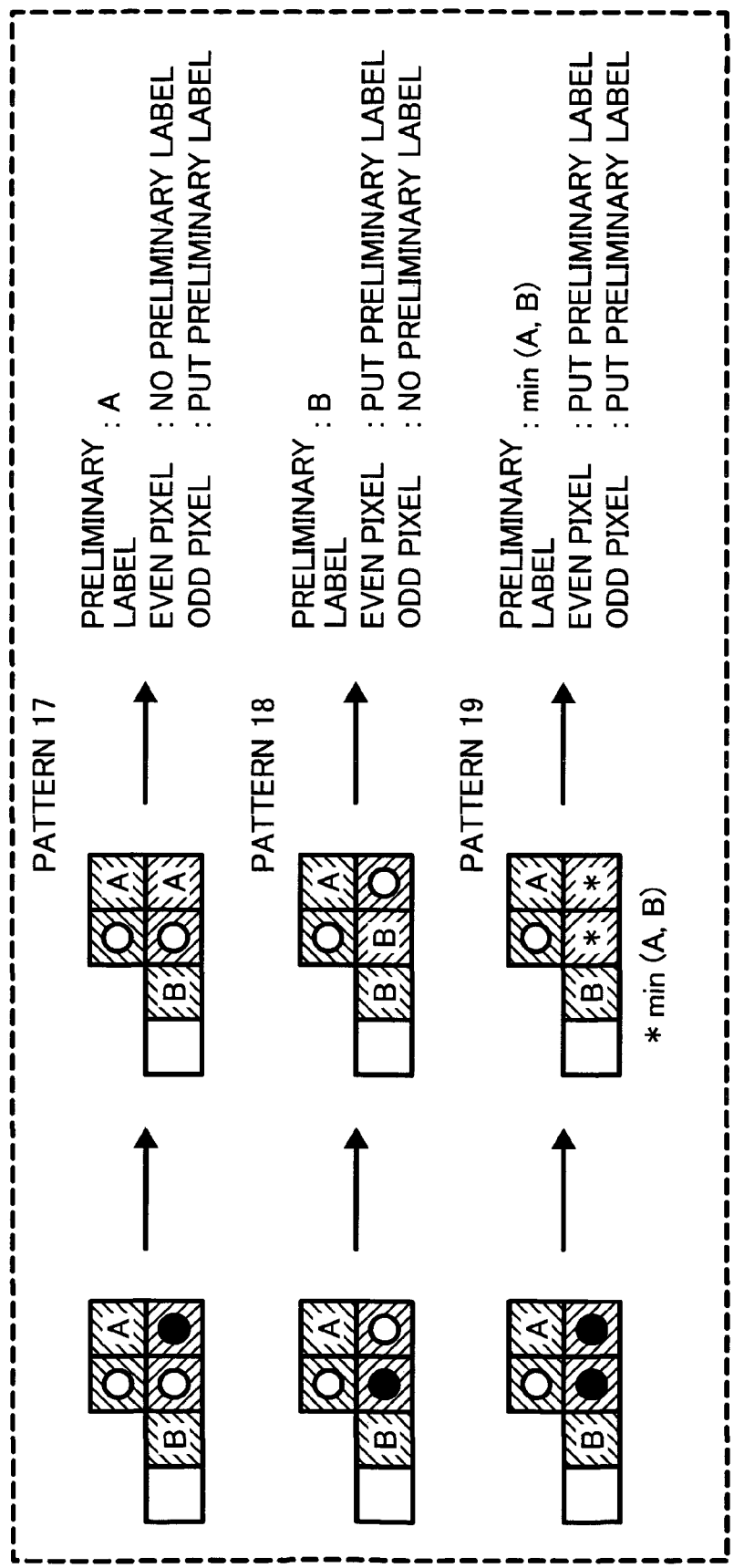
Figure 21:
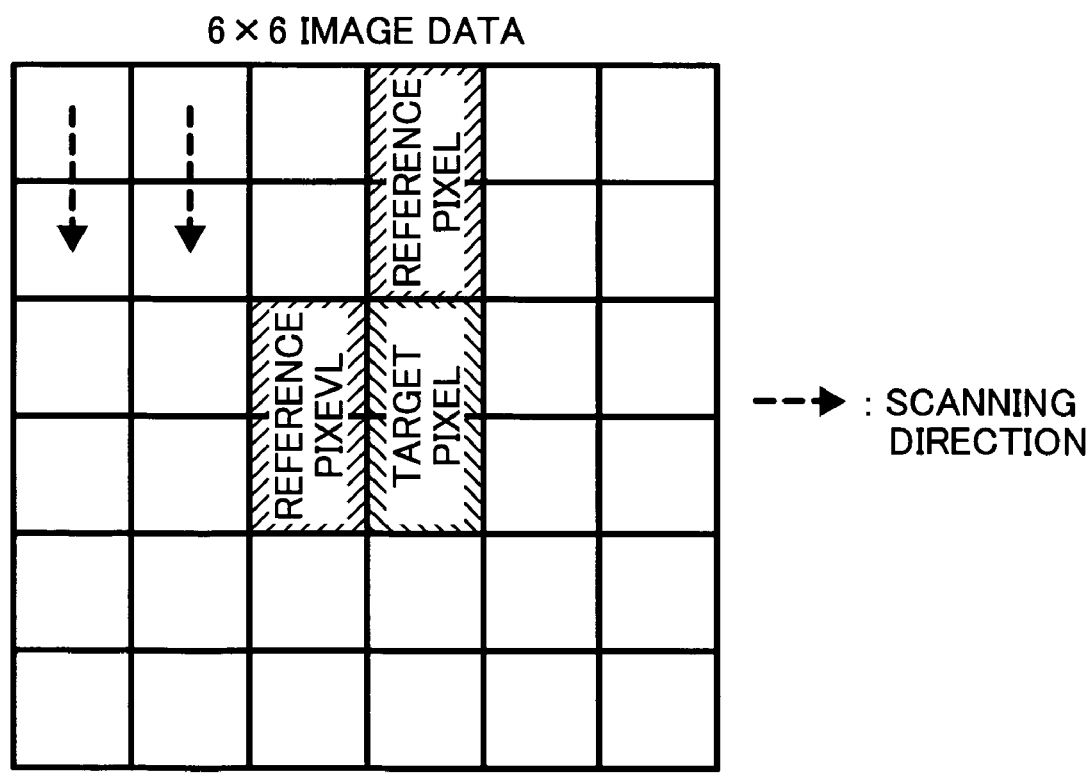
FIG. 21 illustrates an example of a preliminary labeling method according to another exemplary embodiment.

If preliminary labels conflict with each other due to having different values during the labeling process as shown in patterns 19 of FIG. 7B, 21 and 22 of FIG. 8A, 24 and 25 of FIG. 8B, the connecting information (i.e. conflict information) shown by a symbol "*" is stored. The symbol "*" represents min (A,B) and means that a smaller value among values A and B is to be stored. The connecting information is sorted before the primary labeling process starts so that a preliminary label having a smaller labeling value among the preliminary label and other label interlinked to the preliminary label can be identified.

The connecting information after sorting is stored in a memory, for example in a frame memory, by homologizing the preliminary label to an address and by homologizing the other preliminary labeling value interlinked to the preliminary label to a data. If there is no other interlinked preliminary label to the preliminary label, the preliminary label is stored to the data. Further, if a labeling value among the preliminary label and other preliminary label interlinked to the preliminary label is smallest, the labeling value is stored to the data.

More specifically, the preliminary labels and the connecting information are stored in the frame memory as shown in following Table 2.

TABLE 2

| Address | data |
| --- | --- |
| 0000h | 0000h |
| 0001h | 0001h |
| 0002h | 0002h |
| 0003h | 0001h |
| 0004h | 0004h |
| 0005h | 0002h |

The preliminary label 0003h is interlinked to the preliminary label 0001h because the data 0001h is at the address 0003h. Similarly, the preliminary label 0005h is interlinked to the preliminary label 0002h because the data 0002h is at the address 0003h.

If the address value [ADDR] and the data [DATA] are described in a formula RAM [ADDR]=[DATA], a formula RAM [A]=B means that the smallest preliminary label among the preliminary label and other preliminary label interlinked to the preliminary label is B. Further, a formula RAM [A]=A means that there is no other preliminary label interlinked to the preliminary label or the smallest preliminary label among the preliminary label and other preliminary label interlinked to the preliminary label is A. Thus, the primary labeling table is generated by this sorting process.

Figure 9:
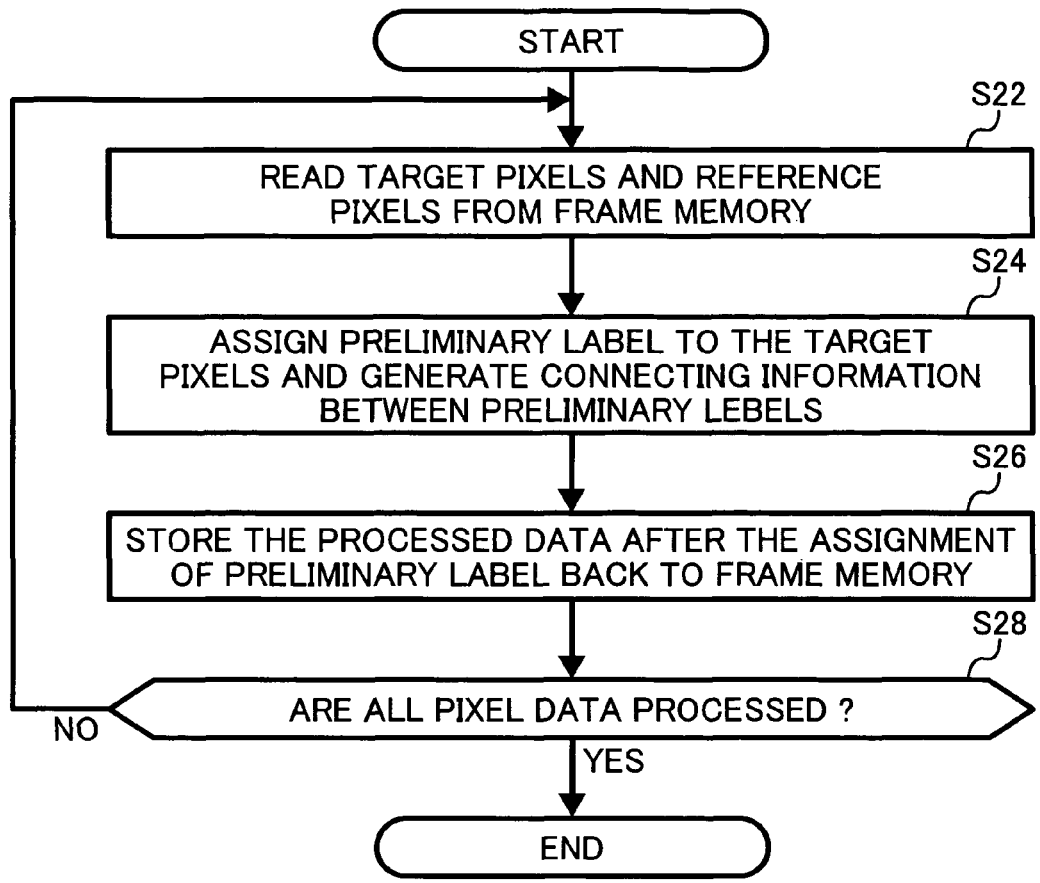
FIG. 9 illustrates a flowchart of the preliminary labeling process according to the exemplary embodiment of FIG. 3.

FIG. 9 illustrates a flowchart of the pre-labeling process according to the exemplary embodiment. The target pixels (two pixels) and the reference pixels (three pixels) are read from the frame memory (S22). One preliminary label is assigned to the target pixels and the connecting information between the preliminary labels is generated (S24). The processing results after the assignment of the preliminary labels are restored in the frame memory (S26). These process steps are performed for all the pixel data. When all pixel data have been processed (i.e., if YES in step S28), the pre-labeling processing has been completed.

Thus, one preliminary label is provided to every two target pixels in the exemplary embodiment. Therefore, it is possible to reduce the data amount down to half of the data amount of the background labeling method where a preliminary label is provided to each target pixel. Moreover, it is possible to reconstitute the processed data to the background data form in which each target pixel is to be processed because the processed data includes the information which implies a background pixel or a feature pixel on the even and odd pixels.

Further, in the primary labeling process in which the preliminary label is translated to the primary label, necessary translation process for each two target pixels is only one. Therefore, it is possible to reduce a number of the translation processes in comparison to the background labeling method in which the translation processes is performed on each target pixel of the two target pixels. According to the labeling method of the exemplary embodiment, an access number to the translation table of the primary labeling process is reduced down to a half of the access number of the background method.

In another exemplary embodiment, a part of labeling process, more specifically a part of preliminary labeling process, is performed using SIMD (single instruction-stream multiple data-stream) processing. The SIMD processing is a data processing which can execute a single instruction with a plurality of data in parallel. A SIMD-type micro processor which can perform the SIMD processing is widely used in image forming apparatuses such as a copier and so on because the SIMD processing can perform parallel executions with high speed.

Figure 10:
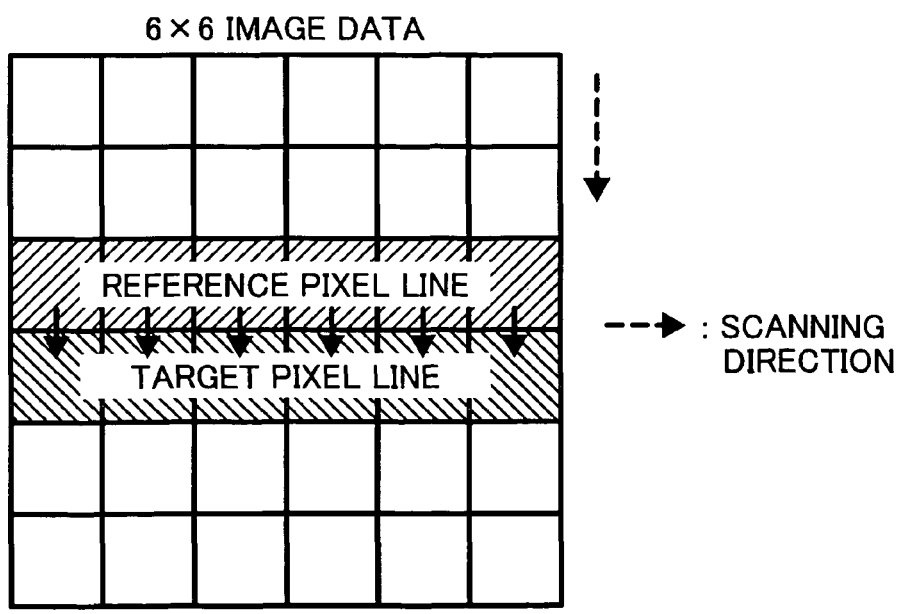
FIG. 10 illustrates a preliminary labeling process reading a target image data having a size of 6×6 pixels in a vertical direction according to another exemplary embodiment.

As for one direction of the binary image data, for example, a vertical direction of FIG. 10, interlinking relationships are judged by the SIMD processing. As for another direction, for example, a horizontal direction shown in FIG. 11, other interlinking relationships of the binary image data are judged by a sequential processing in which the pixels are read and are processed in order.

An interlink-judgment processing performed by the SIMD processing will be described. FIG. 10 illustrates locational relationships between target pixels and reference pixels in the interlink-judgment processing for pixels in a vertical direction according to this exemplary embodiment. The labeling process of this exemplary embodiment is again a four-interlink-pixel processing. Image line data which is located at one line above a target line is referred.

If a preliminary label is assigned on a pixel at a row on the line which is one line above the target line and the binary image data at the same row on the target line is a feature pixel, the preliminary label is copied to the binary image data at the same row on the target line. Using SIMD processor, this process in a vertical direction can be performed for the other pixels on the target line in parallel so as to shorten the process time. This interlink-judgment processing for the vertical direction is performed in advance before the interlink-judgment processing for the horizontal direction.

Figure 11:
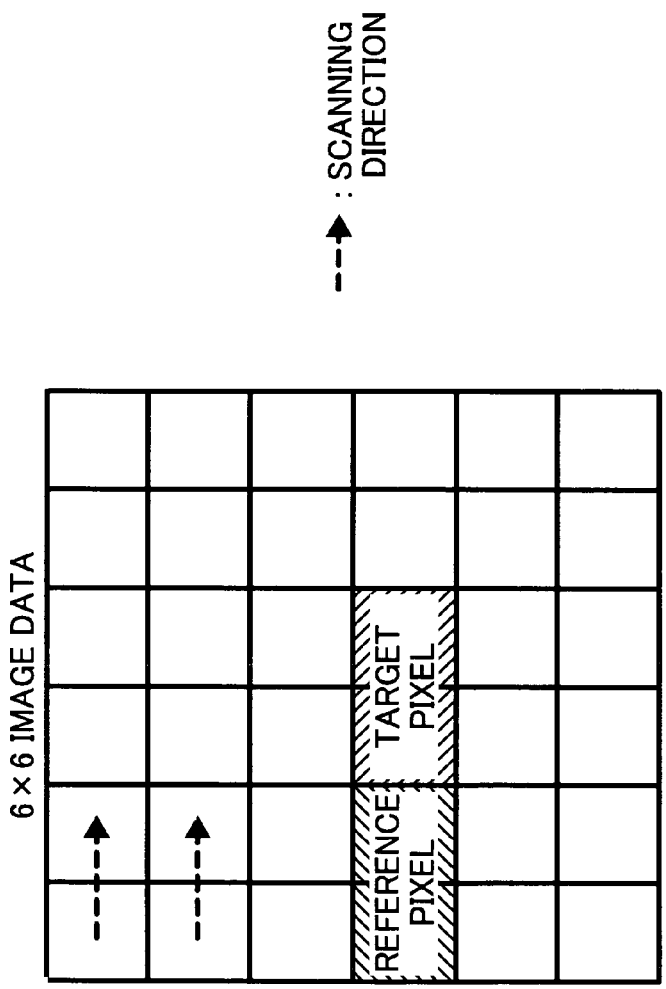
FIG. 11 illustrates the preliminary labeling process reading a target image data in a horizontal direction according to the another exemplary embodiment.

Secondly, the interlink-judgment processing for pixels in the horizontal direction will be described. FIG. 11 illustrates a locational relationship between target pixels and reference pixels in the interlink-judgment processing for pixels in the horizontal direction according to this exemplary embodiment. Regarding pixels neighboring to the target pixels, a right-side pixel among the two pixels is only a necessary pixel to be referred.

Figure 12:
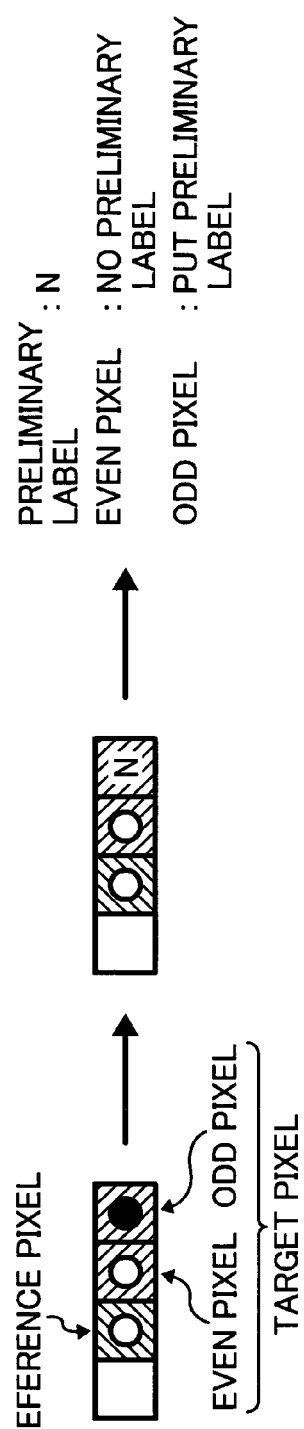

FIG. 12 illustrates an output example of the pre-labeling process of this exemplary embodiment. FIGS. 13A, 13B, 13C, 14A and 14B illustrate the details of the pre-labeling process. A preliminary labeling value is N in the example shown in FIG. 12. A preliminary labeling value to the even pixel is not assigned because it is a background pixel. A preliminary labeling value to the odd pixel is assigned because it is a feature pixel.

FIGS. 13A, 13B, 13C, 14A and 14B illustrate a determination process of a preliminary label to the two target pixels based on the information of the two target pixels and the neighboring pixel locating next left to the two target pixels. If preliminary labels conflict with each other due to having different values during the labeling process as shown in patterns 112 of FIG. 14A, 113, 114 and 115 of FIG. 14B, the connecting information (i.e. conflict information) shown by a symbol "*" is stored at each case similarly to FIG. 7B. Thus, the connecting information is sorted before the primary labeling process starts so that a preliminary label having a smallest labeling value among the preliminary label and other label interlinked to the preliminary label can be identified. The primary labeling table is generated by the sorting process similar to the exemplary embodiment of FIG. 3.

Figure 15:
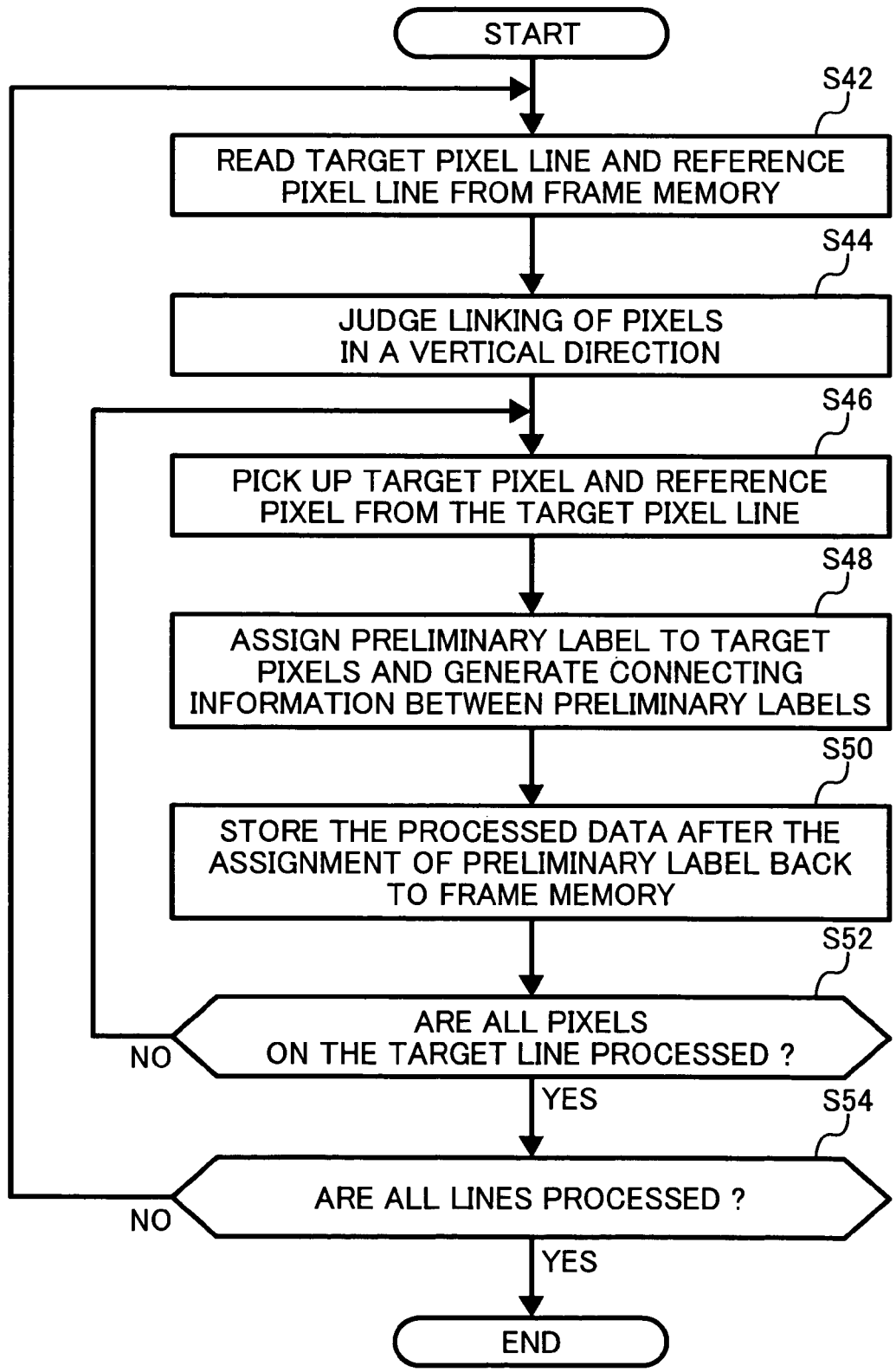
FIG. 15 illustrates a flowchart of the preliminary labeling process according to the exemplary embodiment of FIGS. 10 and 11.

FIG. 15 illustrates a flowchart of the pre-labeling process according to the exemplary embodiment of FIGS. 10 and 11. The target pixel line and the reference pixel line are read from the frame memory (S42). The interlink-judgment processing for pixels in a vertical direction is performed as shown in FIG. 10. (S44) Then, a pre-labeling process is performed on the target line. The target pixel data and the reference pixel data are picked up from the target line. (S46) A preliminary label is assigned to the target pixels and the connecting information between the preliminary labels is generated (S48).

The processing results after the assignment of the preliminary labels are restored in the frame memory. (S50) These process steps are performed for all the pixel data on the target line. (S52) When all pixel data have been processed on the target line (i.e., if No in step S54), the next pixel line is targeted. When all the lines have been processed (steps S42 to S50), the pre-labeling processing has been completed.

In another exemplary embodiment shown in FIG. 16, it is described that the output data of pre-labeling process according to the exemplary embodiments of FIG. 3 and FIGS. 10 and 11 are integrated into one data format. Namely, the output data with one data format include a preliminary label, a background pixel or a feature pixel (preliminary label) for an even pixel and a background pixel or a feature pixel (preliminary label) for an odd pixel.

FIG. 16 illustrates an example of an output data of a preliminary label. The 16 bites data size is used as shown in FIG. 16. In the two upper bits of the output data, feature information indicating whether it is a background pixel or feature pixel is stored. In the fourteen lower bits of the output data, a preliminary label is stored. This 16 bits data is stored in the frame memory as an output of the pre-labeling process.

The frame memory is generally controlled by addressing with byte levels such as 8 bits and 16 bits and so on. Therefore, the data with bytes configuration generated by this method is easy to handle at reading and extracting of the data. In the exemplary embodiment of FIG. 16, the preliminary label size is limited up to a 14-bits wide. However, a necessary storage capacity of the frame memory becomes half in comparison to the background method where a preliminary label is stored in 16-bits wide using whole 16-bits for the preliminary label.

In another exemplary embodiment shown in FIG. 17, it is described that output data of primary labels are integrated into one data format. Namely, the output data with one data format include a primary label, a background pixel or a feature pixel (primary label) for an even pixel and a background pixel or a feature pixel (primary label) for an odd pixel.

FIG. 17 illustrates an example of an output data of a primary label. The 16 bites data size is used as shown in FIG. 17. In the two upper bits of the output data, feature information indicating whether it is a background pixel or feature pixel is stored. In the fourteen lower bits of the output data, a primary label is stored. This 16 bits data is stored in the frame memory as an output of the primary labeling process.

This primary labeling process is realized using a translation table similarly as explained in the exemplary embodiment of FIG. 3. The image data after pre-labeling process is sequentially scanned and read. The translation table is accessed by addressing with an address using the preliminary label stored in the lower 14 bits of the output data. The lower 14 bits of the data is replaced by exchanging the preliminary label to a primary label.

Similar to the exemplary embodiment of FIG. 16, it is easy to handle the data after primary labeling process with this data configuration while storing and extracting the data. Further, a necessary storage capacity of the frame memory becomes half in comparison to the background method similarly to the exemplary embodiment of FIG. 16.

Figure 18:
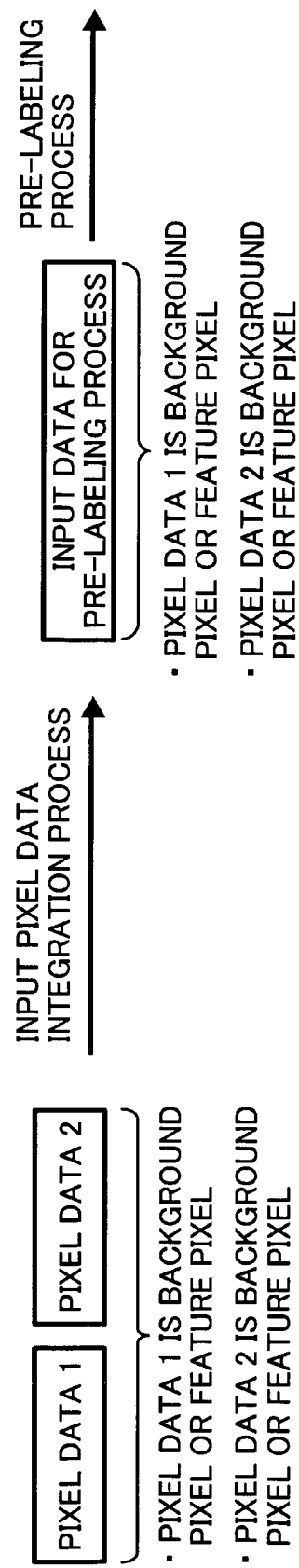
FIG. 18 illustrates an example of a preliminary labeling method according to another exemplary embodiment.
Figure 19:
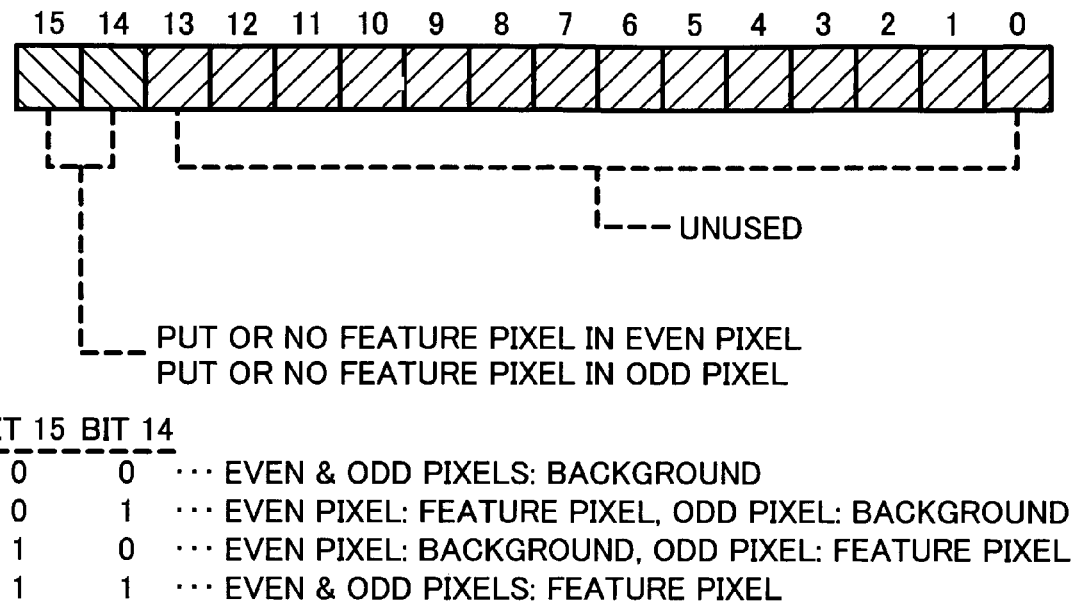
FIG. 19 illustrates an example of an output data of a preliminary label according to the exemplary embodiment of FIG. 18.

FIG. 18 illustrates an example of a labeling method according to another exemplary embodiment. In the exemplary embodiment of FIG. 18, two target pixel data are integrated into one data before a preliminary labeling process as shown in FIG. 19. The preliminary labeling process is then performed to the integrated data.

Namely, the two target pixel data are translated into two information data, i.e., a background pixel or a feature pixel for an even pixel and a background pixel or a feature pixel for an odd pixel. They are integrated into one data format and a preliminary labeling process is then performed to the integrated data.

The integrated data shown in FIG. 19 includes background pixel or feature pixel information in each even and odd pixel. Therefore, it is possible to apply the integrated data to the pre-labeling process related to the exemplary embodiments of FIG. 3 and FIGS. of 10 and 11 based on the integrated data of FIG. 19.

Figure 20:
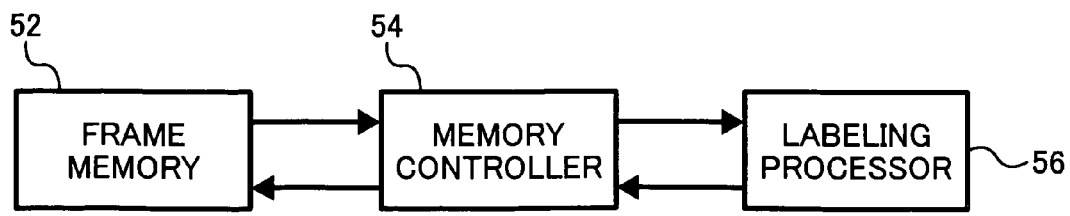
FIG. 20 illustrates an example circuit to perform an integration process to generate the data of FIG. 19.

FIG. 20 illustrates an example schematic circuit to perform the integration process to generate the data of FIG. 19. The circuit includes a frame memory 52, a memory controller 54 and a labeling processor 56. The frame memory 52 is configured to store input image data. The labeling processor 56 is configured to perform a labeling processing. The memory controller 54 is arranged between the frame memory 52 and the labeling processor 56 and is configured to read and write the image data.

In a labeling method according to another exemplary embodiment, input image data is scanned in a vertical direction by each two successive pixels as shown in FIG. 21. Image data is read with units of two pixels and a labeling process is performed similarly to the exemplary embodiments of FIG. 3 and FIGS. of 10 and 11. Therefore, the procedure described in the exemplary embodiments of FIG. 3 and FIGS. of 10 and 11 can be applicable to the exemplary embodiment of FIG. 21.

Numerous additional modifications and variations are possible in light of the above teachings. It is therefore to be understood that within the scope of the appended claims, the disclosure of this patent specification may be practiced otherwise than as specifically described herein.

What is claimed is:

1. A method of labeling of image data, comprising the steps of:
   using at least one computer processor to process image data with a plurality of units of two successive pixels in a scanning direction;
   assigning, using the at least one computer processor, a preliminary label to each of the plurality of units of two successive pixels in the scanning direction, wherein each of the plurality no more than one preliminary label;
   generating, using the at least one computer processor, a unit of output data for each of the units of two successive pixels, the unit of output data comprising a first portion identifying the preliminary label assigned to a unit of two successive pixels and a second portion identifying whether the preliminary label applies to each of an even pixel and an odd pixel of the unit of two successive pixels; and
   storing said unit of output data on a storage medium.

2. A method of labeling of image data, comprising the steps of:
   using at least one computer processor to process image data with a plurality of units of two successive pixels in a scanning direction;
   assigning, using the at least one computer processor, a primary label to a plurality of units of two successive pixels in the scanning direction, wherein each of the plurality of units of two successive pixels is assigned no more than one primary label;
   generating, using the at least one computer process, a unit of output data for each of the units of two successive pixels, the unit of output data comprising a first portion identifying the primary label assigned to a unit of two successive pixels and a second portion identifying whether the primary label applies to each of an even pixel and an odd pixel of the unit of two successive pixels; and
   storing unit of output data on at least one storage medium.

3. A method of labeling of image data, comprising the steps of:
   inputting image data;
   storing the image data on at least one storage medium;
   reading the image data with units of two successive pixels in a scanning direction;
   using at least one computer processor to generate a unit of output data for each of the units of two successive pixels, the unit of output data including a first portion identifying a single label assigned to a unit of two successive pixels and a second portion identifying whether the single label applies to each of an even pixel and an odd pixel of the unit of two successive pixels; and
   storing the unit of output data on the storage medium.

4. The method of claim 1, wherein the image data is scanned and read sequentially in a horizontal direction.

5. The method of claim 1, wherein the image data is scanned and read sequentially in a vertical direction.

6. The method of claim 1, further comprising the steps of:
   reading the image data with units of two lines in a vertical direction; and
   copying a preliminary label which is assigned on a pixel at a row on the line one line above a target line to one of the two successive pixels at the same row on the target line.

7. A image processing apparatus capable of labeling image data, comprising:
- a memory configured to store image data;
- a processor configured to process image data with units of two successive pixels in a scanning direction after the assignment of preliminary labels and to generate a unit of output data for each of the units of two successive pixels, the unit of output data including a first portion identifying a preliminary label assigned to a unit of two successive pixels and a second portion identifying whether the preliminary label assigned applies to each of an even pixel and an odd pixel of the unit of two successive pixels; and
- a memory controller arranged between the memory and the processor and configured to control reading and writing the image data.

8. A image processing apparatus capable of labeling image data, comprising:
- a memory configured to store image data;
- a processor configured to process image data with units of two successive pixels in a scanning direction after the assignment of primary labels and to generate a unit of output data for each of the units of two successive pixels, the unit of output data including a first portion identifying a primary label assigned to a unit of two successive pixels and a second portion identifying whether the primary label assigned applies to each of an even pixel and an odd pixel of the unit of two successive pixels; and
- a memory controller arranged between the memory and the processor and configured to control reading and writing the image data.

9. A image processing apparatus capable of labeling image data, comprising:
- a memory configured to store image data;
- a processor configured to process image data with units of two successive pixels in a scanning direction and to generate a unit of output data for each of the units of two successive pixels, the unit of output data including a first portion identifying a single label assigned to a unit of two successive pixels and a second portion identifying whether the single label applies to each of an even pixel and an odd pixel of the unit of two successive pixels; and
- a memory controller arranged between the memory and the processor and configured to control reading and writing the image data.

10. The image processing apparatus of claim 7, wherein the image data is scanned and read sequentially in a horizontal direction.

11. The image processing apparatus of 7, wherein the image data is scanned and read sequentially in a vertical direction.

12. The method of claim 1, further comprising:
- generating connecting information that identifies a relationship between the plurality of preliminary labels and storing the plurality of preliminary labels in a plurality of addresses of the storage medium in a manner that identifies the relationship.

13. The method of claim 3, further comprising:
- generating connecting information that identifies a relationship between a plurality of single labels assigned and storing the plurality of single labels in a plurality of addresses of the storage medium in a manner that identifies the relationship.

14. The image processing apparatus of claim 7, wherein the processor is configured to generate connecting information that identifies a relationship between a plurality of preliminary labels assigned and store the plurality of preliminarily labels in a plurality of addresses of the memory in a manner that identifies the relationship.

15. The image processing apparatus of claim 9, wherein the processor is configured to generate connecting information that identifies a relationship between a plurality of single labels assigned and store the plurality of single labels in a plurality of addresses of the memory in a manner that identifies the relationship.

16. The method of claim 1, wherein the manner that identifies the relationship includes storing each of a plurality of the plurality of preliminary labels in an address of the memory that is associated with another one of the plurality of preliminary labels.

17. The image processing apparatus of claim 7, wherein the manner that identifies the relationship includes storing each of a plurality of the plurality of preliminary labels in an address of the memory that is associated with another one of the plurality of preliminary labels.

18. The method of claim 1, wherein the second portion is stored as a two bit binary representation.

19. The image processing apparatus of claim 7, wherein the processor is configured to store the second portion in the memory as a two bit binary representation.

* * * * *